March 19, 1929. C. P. TOLMAN 1,706,367
SPLICE
Filed March 28, 1927
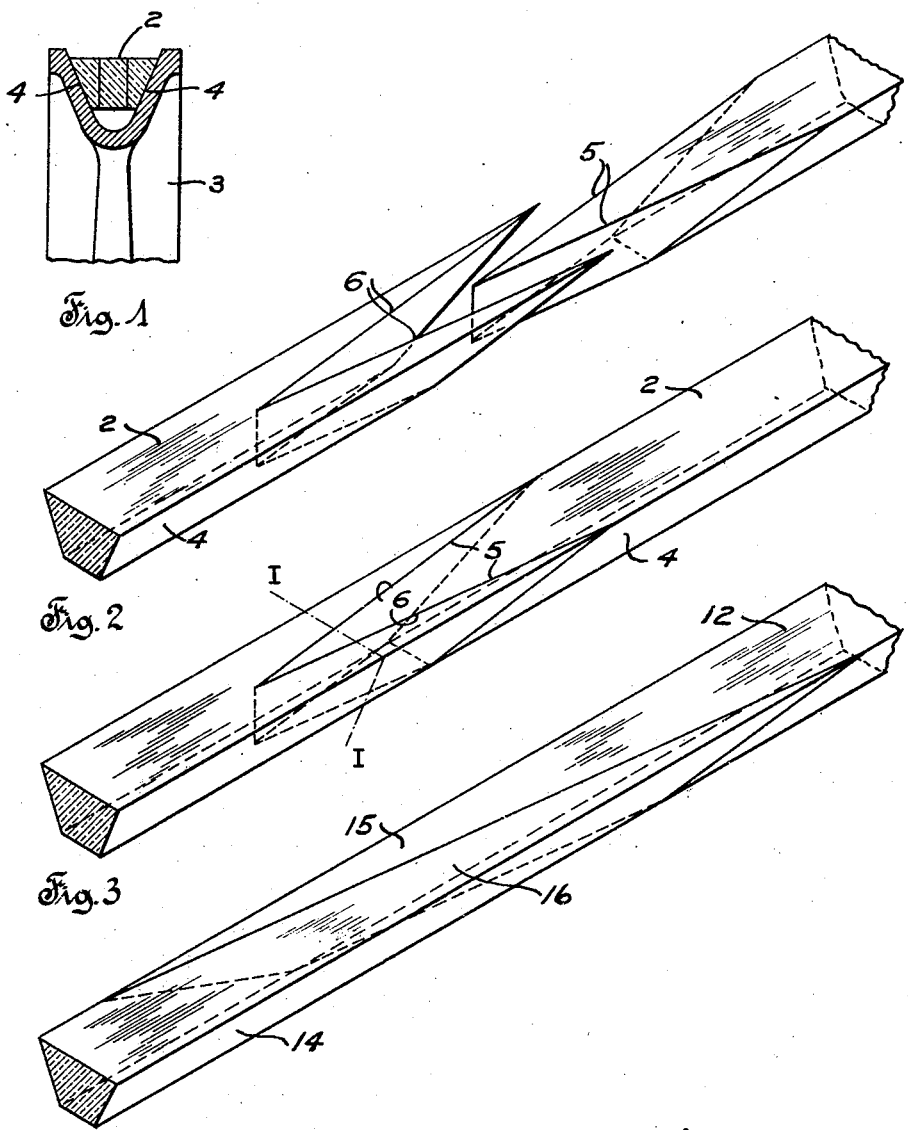

Patented Mar. 19, 1929.

1,706,367

UNITED STATES PATENT OFFICE.

CHARLES P. TOLMAN, OF NEW YORK, N. Y., ASSIGNOR TO ALLIS-CHALMERS MANUFACTURING COMPANY, OF MILWAUKEE, WISCONSIN, A CORPORATION OF DELAWARE.

SPLICE.

Application filed March 28, 1927. Serial No. 178,985.

This invention relates in general to improvements in the art of splicing transmission elements such as ropes, belts or cables.

An object of the invention is to provide a relatively simple splice especially applicable to laterally compressible belts having opposite side driving surfaces, which will tend to become more secure when the driving pressure is applied to the belt.

The splicing of V-belts formed of fabric or cords impregnated and embedded in soft rubber, has presented a difficult problem. An effective commercial splice must not only provide an inseparable union between the belt ends, but it should also be rapidly and conveniently applicable. With the present invention, all of these desirable characteristics are incorporated in the splice, and the greater the pressure applied during driving, the firmer the coaction becomes at the adjacent belt ends. This latter characteristic results from the provision of coacting surfaces at the belt ends, which tend to more intimately engage each other upon application of the driving pressure to the opposite surfaces of the belt.

A clear conception of the method of forming a splice in accordance with the present invention and of the details of construction of several embodiments of the improvement, may be had by referring to the drawing accompanying and forming a part of this specification in which like reference characters designate the same or similar parts in the various views.

Fig. 1 is a transverse sectional view through a driving sheave rim and through the splice of a V-belt coacting therewith.

Fig. 2 is a perspective view of the adjacent ends of a belt, showing the same separated prior to formation of a splice.

Fig. 3 is a perspective view of the spliced portion of a belt, embodying one form of the invention.

Fig. 4 is a perspective view of the spliced portion of a belt, embodying another form of the invention.

Referring specifically to Figs. 1, 2 and 3, the V-belt 2 is provided with tapered opposite side drive surfaces 4 which are preferably coated or otherwise provided with relatively soft compressible material such as rubber, and are adapted to drivingly engage the side surfaces of the V-grooves of pulleys 3. The adjacent ends of the belt 2 are provided with surfaces 5, 6 which are adapted to coact with each other when the splice has been assembled. The belt ends are preferably cemented or otherwise attached to each other at the coacting surfaces 5, 6 and these surfaces are so disposed that they will approach each other upon application of pressure to the side driving surfaces 4, at the splice. The surfaces 5, 6 intersect the side surfaces 4 along lines and are preferably disposed substantially perpendicular to the axes of the sheaves 3 with which the belts 2 coact. The surfaces 5, 6 may be formed either by cutting the belt ends or by molding the same to the desired shape during formation of the belt and should be formed to provide a neat and compact splice as shown in Fig. 3 when the ends of the belt have been united.

Referring specifically to Fig. 4, the V-belt 12 is likewise provided with tapered opposite side driving surfaces 14 and has its adjacent ends 15, 16 provided with coacting surfaces extending diagonally across the belt in a single plane. The belt ends 15, 16 may be united along the coacting diagonal surfaces by cementing or otherwise and the coacting surfaces are again disposed to approach each other upon application of pressure to the side driving surfaces 14 adjacent to the splice.

The operation of the belt will be readily understood from the foregoing description of the construction thereof. The important feature of the invention is the disposition of the coacting surfaces at the splice so that the application of side driving pressure to the belt will tend to produce more intimate coaction between the belt ends at the coacting surfaces. As the belt proceeds along the V-groove of a pulley 3, it is drawn inwardly toward the axis of the pulley thus tending to produce lateral pressures along the side driving surfaces. This action obviously tends to strengthen the splice rather than to disrupt the same thereby insuring relatively long life for the belt, especially at the splice.

It will be apparent that by providing surfaces of coaction at the belt ends, having relatively great area, a strong and durable splice results. The wedge shaped splice of Fig. 3 provides approximately twice as much surface of coaction as a splice of the same length made in accordance with Fig. 4. It is therefore especially desirable to make a splice such as shown in Fig. 4, as long as possible. When operating a belt spliced according to Fig. 4 there is no choice as to direction of travel, but when the rope is spliced according to Fig. 3 it may desirably be run with the narrow end of the wedge foremost. By so doing the thicker end of the scarf enters the groove first and the splice progressively "pulls in" to the groove so that the thin end is well supported before it is subjected to such shearing stress as may be produced by the action of "pulling in."

In view of the fact that the greatest stress in a splice occurs when the splice is passing over a sheave, and especially a sheave of small diameter, the gradual tapering of the belt ends to relatively thin edges, is extremely important. These thin edge portions are relatively flexible and will bend easily thereby eliminating tendency to pull away from the adjacent belt end. The side pressure is also more effective in forcing the thin edges into firm engagement with the adjacent belt end thus insuring longer life of the splice.

It should be understood that it is not desired to limit the invention to the exact details of construction and to the precise steps of forming the splice, herein shown and described, for various modifications within the scope of the claims may occur to persons skilled in the art.

It is claimed and desired to secure by Letters Patent:

1. An article of manufacture comprising a rubber surfaced V-belt having opposite tapered driving surfaces, said belt being spliced along interconnected coacting end surfaces, intersecting said driving surfaces along lines and said surfaces being disposed to approach each other upon application of pressure to the belt driving surfaces adjacent to said coacting surfaces.

2. An article of manufacture comprising a transmission belt having side driving surfaces, said belt being spliced along coacting end surfaces extending diagonally of said driving surfaces and adapted to more intimately engage each other upon application of pressure to the belt driving surfaces.

3. An article of manufacture comprising a transmission belt having opposite simultaneously functioning side driving surfaces, said belt being spliced along coacting end surfaces extending diagonally of said driving surfaces.

4. An article of manufacture comprising a transmission belt having opposite side driving surfaces, said belt being spliced along coacting end surfaces intersecting at least one of said driving surfaces along a line which is inclined in the direction of normal travel of the belt.

5. An article of manufacture comprising a transmission belt having opposite side driving surfaces, said belt being spliced along coacting end surfaces the length of which is at least twice the greatest width of the belt and which surfaces extend diagonally of said driving surfaces.

In testimony whereof, the signature of the inventor is affixed hereto.

CHARLES P. TOLMAN.